United States Patent [19]
Dyer

[11] Patent Number: 5,417,478
[45] Date of Patent: May 23, 1995

[54] ELECTROHYDRAULIC BRAKING SYSTEM WITH CARBON-PILE VOLTAGE REGULATOR

[76] Inventor: William B. Dyer, 3358 Taylor Rd., Central Point, Oreg. 97502

[21] Appl. No.: 219,924

[22] Filed: Mar. 30, 1994

[51] Int. Cl.⁶ .............................................. B60T 13/74
[52] U.S. Cl. ................................. 303/3; 303/15; 303/7; 338/109; 338/107
[58] Field of Search ................. 303/3, 7, 15, 20; 188/158, 161, 164; 338/101, 107, 108, 109

[56] References Cited

U.S. PATENT DOCUMENTS

| | | | |
|---|---|---|---|
| 2,454,291 | 11/1948 | Penrose | 303/7 |
| 3,328,739 | 6/1967 | McInnis et al. | 338/96 |
| 3,524,159 | 1/1968 | Kilbourn | 338/92 |
| 3,704,042 | 11/1972 | Sturgeon | 303/3 |
| 3,740,691 | 6/1973 | Brown | 338/39 |
| 3,823,985 | 7/1974 | Hubbard | 303/15 |
| 3,827,758 | 8/1974 | Hansen | 303/10 |
| 3,909,075 | 9/1975 | Pillet, Jr. et al. | 303/24 |
| 3,981,542 | 9/1976 | Abrams et al. | 303/7 |
| 4,233,587 | 11/1980 | Augustine | 338/96 |

Primary Examiner—Robert J. Oberleitner
Assistant Examiner—Lee W. Young
Attorney, Agent, or Firm—James D. Givnan, Jr.

[57] ABSTRACT

A braking system for a vehicle such as a trailer having electric brakes which utilizes a carbon-pile voltage regulator. A piston of the regulator is responsive to hydraulic pressures occurring in the tow vehicle brake system to bias the disks to increase current flow. An electromagnet is utilized to preload the carbon disks with a gain control provided in circuit with the electromagnet to vary preloading. Mechanical means are provided in the regulator to limit outward displacement of the piston component of the regulator and, in a modified form of the regulator, a core of the electromagnet. Hydraulic fluid acting on the regulator is isolated from the fluid of the hydraulic brake system by a diaphram unit.

7 Claims, 1 Drawing Sheet ically actuated brakes 15 utilizing a carbon-pile regulator the resistance of which

ELECTROHYDRAULIC BRAKING SYSTEM WITH CARBON-PILE VOLTAGE REGULATOR

BACKGROUND OF THE INVENTION

The present invention pertains generally to a system for applying current flow to the brakes of a towed vehicle during braking of a tow vehicle.

Common in the recreational trailer field is the use of electric brakes actuated during braking of a tow vehicle by various types of electric and electronic brake controllers located in the tow vehicle.

In spite of substantial effort to provide braking systems for such towed vehicles, a problem remains in satisfactorily regulating the electrically actuated brakes of such towed vehicles. Periodic adjustment of trailer braking systems by skilled personnel is necessary to provide adequate braking operation. As trailer brakes are, for the most part, electric the control of current flow to such brakes must be in fine increments.

Efforts in the past have included inertia responsive pendulums in brake controllers located within the tow vehicle which controllers are separate from the tow vehicle hydraulic brake system. An example of such an inertia responsive controller is disclosed in U.S. Pat. No. 3,909,075. For one reason or another such inertial responsive controllers do not overcome the above objections to known braking systems. Such controllers function only when a pendulum responds to changes in speed of the tow vehicle. A number of U.S. patents disclose the combination of a brake controller which, at least partially, relies on a piston actuated by the tow vehicle hydraulic brake system to displace an electrical contact for engagement with a resistor at points along the latter with current flow from the resistor to electrical trailer brakes being determined by the point along the resistor at which contact is made by the hydraulically biased contact member. Examples of the immediately above described controllers are found in U.S. Pat. Nos. 3,704,042, 3,524,159, 3,740,691, 3,328,739 and 4,233,587. All such known braking systems dependent upon hydraulic pressure from the tow vehicle's braking system encounter the drawback of tapping into the master cylinder output line. Further, on vehicles equipped with an antilock brake system such tapping into a master cylinder output line would jeopardize system operation. The prior art systems utilizing hydraulically actuated plungers, pistons, etc., to position a contact into engagement with the coil of a resistor incurs fluid displacement and possible loss by wear of mechanical components. Current brake controllers for regulating current flow to the electric brakes of trailers rely solely on mechanical and electric components to regulate current flow to the brakes.

SUMMARY OF THE PRESENT INVENTION

The present invention is embodied within a system for regulating current flow to electrically actuated brakes of a vehicle with the system including a voltage regulator highly responsive to minute movements of a pressure responsive component indirectly actuated by hydraulic pressure in a tow vehicle brake system.

The present trailer brake system includes primary and secondary quantities of hydraulic fluid responsive to master brake cylinder pressures. The fluids are isolated from one another. The use of carbon disk regulator in the present brake control system permits current flow changes to brakes to be accomplished with minimal displacement of a pressure responsive element. Provision is made for loading of the carbon disks of the voltage regulator for providing a desired voltage prior to initiation of braking the tow vehicle to assure desired braking action by the trailer brakes.

Important objectives of the present braking system include the provision of a carbon-pile type voltage regulator in a trailer braking system which utilizes minimal hydraulic fluid displacement of a quantity of fluid isolated from the fluid of the tow vehicle hydraulic brake system to permit use of the present system without jeopardizing the integrity of the tow vehicle braking system, which may be either conventional or of the antilock type; the provision of a brake control system utilizing a carbon-pile regulator the resistance of which is controllable in a remote manner by a gain control and which is highly sensitive to physical displacement of a fluid biased component to render a system operable with but minimal fluid displacement; the provision of a brake controller for actuation of electrical brakes which avoids eratic braking action experienced with known controllers by avoiding inertia responsive components of the type used in current brake controllers.

DETAILED DESCRIPTION OF THE PREFERRED EMBODIMENTS

Figure 1:
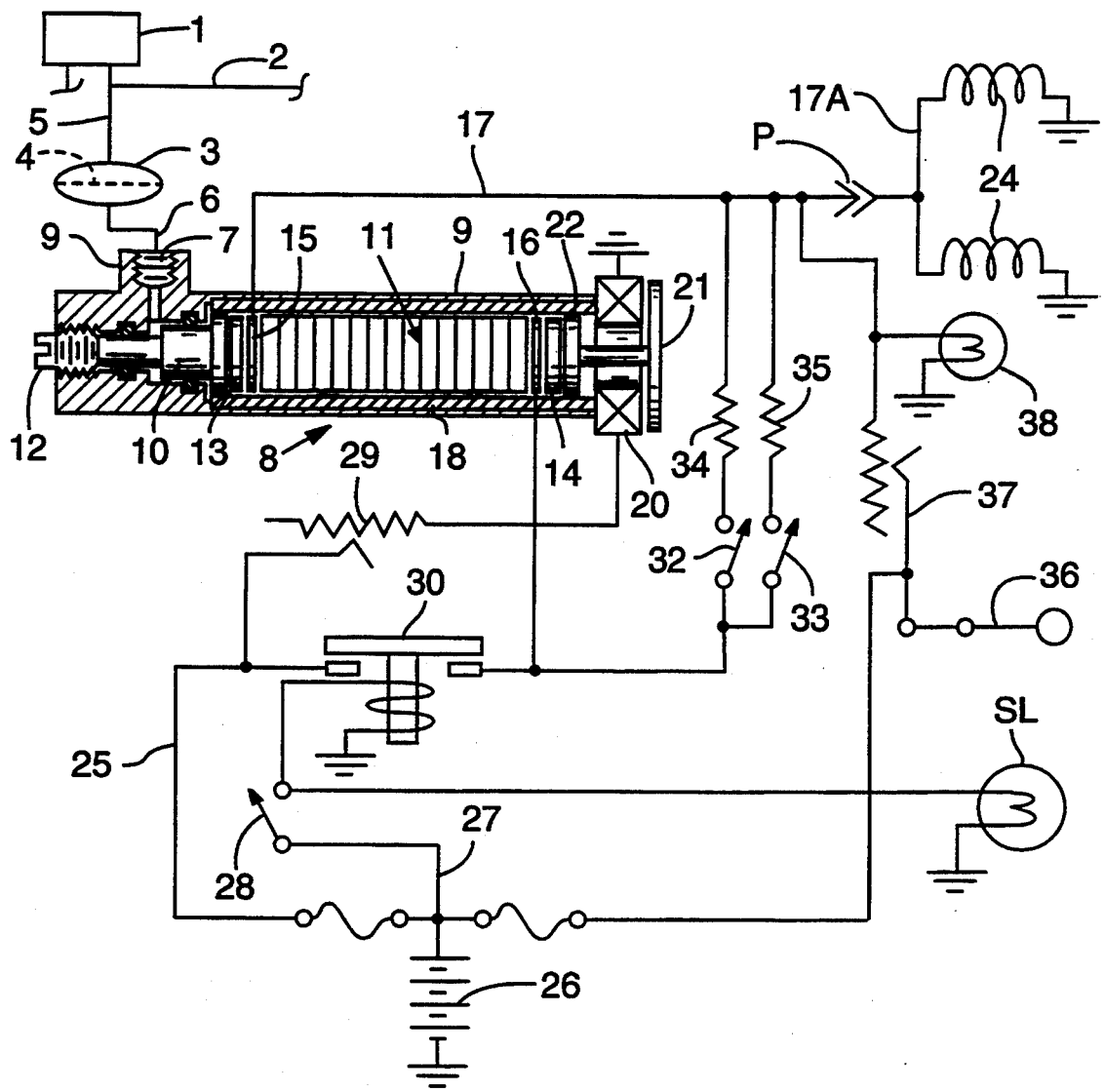
FIG. 1 is a schematic of the present brake system for vehicles equipped with electrical brakes.

With continuing attention to the drawings wherein applied reference numerals indicate parts similarly hereinafter identified, the reference numeral 1 indicates the master brake cylinder of a tow vehicle. A hydraulic line as at 2 provides communication with wheel cylinders of the tow vehicle brake system either directly or through an automatic braking system of the antilock type.

The present braking system for a towed vehicle includes a pressure transmitting means shown as a diaphram unit 3 with a membrane 4 served by a first hydraulic line 5 in communication with brake cylinder output line 2. A second hydraulic line 6 terminates in connection with a port 7 in a housing 9 of a carbon-pile voltage regulator indicated generally at 8. While shown spaced from master cylinder 1, diaphram 3 may be part thereof or affixed thereto. Both conduits or lines 2, 5 and 6 as well as diaphram unit 3 are at all times fully charged with fluid which during operation of master brake cylinder I is pressurized to act on a pressure responsive piston 10 adjacent one end of a series of carbon disks 11. An adjustment screw 12 constitutes a stop enabling the positioning of piston 10 in a precise manner when in an unbiased state. Insulative disks are at 13 and 14 with a sleeve at 18 also being a non-conductor. Inwardly of disks 13 and 14 are conductive disks 15 and 16 with the carbon disks 11 conducting current flow therebetween determined by the resistance of the regulator which varies inversely proportional to pressure applied endwise of the stack of disks. Oppositely disposed from piston 10 is an electromagnet 20 with a core 21 having a disk 22 serving to provide an abutment for the stacked disks 11 when electromagnet 20 is energized. A conductor 17 carries the regulator output to a towed vehicle conductor 17A via a suitable plug P. Coils at 24 represent electromagnets in the two electric brake assemblies of a single axle towed vehicle. Such towed vehicles may, of course, include several axles each with a pair of electrical brakes.

As noted above, core 21 serves to oppose forces oppositely applied to carbon disks 11 by piston 10. Sleeve 15 is of dielectric material and confines the carbon disks 11 in stacked fashion.

A battery source 26 of the tow vehicle provides current via conductor 27 to one side of a switch 28 which may be a stop light switch for stop light SL. A relay 30 closes upon closure of switch 28 in a braking sequence to apply current to disk 16 in the regulator. Loading of the regulator disks 11 by piston 10 the extent being determined by fluid pressure in line 6 during braking of the tow vehicle. The current flow between conductors 15–16 will be in direct proportion to the fluid pressure in line 6 to energize the trailer brake electromagnets 24.

A manually set gain control 29 determines the voltage applied to electromagnet 20 of the regulator with voltage provided by conductor 25.

Manually positionable switches 32 and 33 are set during the installation of the present braking system and reset only when a change is made of towed vehicles such as from a towed vehicle with one axle having two brakes to a substituted towed vehicle with two axles and a total of four electric brakes. Fixed resistors are indicated at 34 and 35 and control a threshold current to each of the trailer brake assemblies. A control at 36 is manually actuated and provides a backup with current flow via a variable resistor 37 and then to conductors 17 and 17A.

Figure 2:
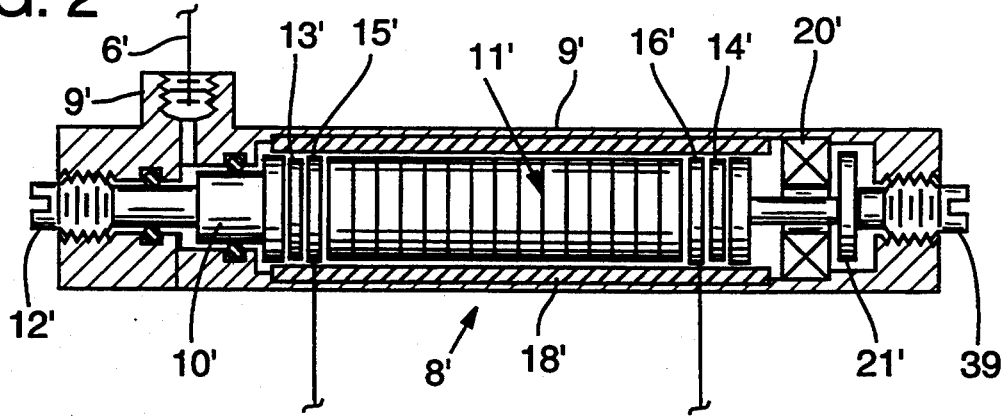
FIG. 2 is an enlarged schematic view of a regulator utilizing stacked carbon disks.

In FIG. 2 a modified carbon-pile voltage regultor is shown generally at 8' with prime reference numerals indicating parts earlier identified with like base reference numerals. In the modified regulator a settable member 39 limits outward travel of a core 21' of electromagnet 20'.

In operation of the present system the switches 32–33 will be set to provide the requisite threshold current to one, two or three pairs of electric trailer brakes as for example by closing only switch 32 for a single axle pair of brakes; closing only switch 33 for a double axle trailer with two pairs of brakes, or; closing both switches 32–33 for a triple axle trailer. An indicator light 38 will glow to indicate initial current flow in conductor 17 with increased illumination indicating operation of the regulator 8 as braking effort is increased.

While I have shown but a few embodiments of the invention, it will be apparent to those skilled in the art that the invention may be embodied still otherwise without departing from the spirit an scope of the invention.

Having thus described the invention, what is desired to be secured by a Letters Patent is:

I claim:

1. A brake control system for actuating electric brakes of a towed vehicle simultaneously with a hydraulic brake system in a tow vehicle, said brake control system comprising, a carbon pile voltage regulator with abutting carbon disks and including pressure responsive means subject to pressure changes occurring in the hydraulic brake system in the tow vehicle, electromagnetic means for axially preloading said disks, a gain control in circuit with said electromagnetic means to enable varying end loading of said disks, conductive means in circuit with a power source and with the electric brakes of the towed vehicle with current flow to said brakes regulated by the action of said pressure responsive means on said disks, switch means in circuit with said source and said conductive means of the voltage regulator and actuated by fluid pressure in the hydraulic brake system of the tow vehicle during brake system operation, threshold switch means in circuit with said source and said electric brakes of the trailer, pressure transmitting means responsive to the hydraulic brake system of the tow vehicle and including a diaphram, first and second hydraulic lines in communication with opposite sides of said diaphram.

2. The brake control system claimed in claim 1 wherein said electromagnetic means has a core operable to impart endwise loading to said disks, said gain control having a manual control.

3. The brake control claimed in claim 1 wherein said voltage regulator includes manually settable means, said pressure responsive means including a piston, said manually settable means biasing said piston toward said carbon disks.

4. The brake control system claimed in claim 3 wherein said manually settable means includes threaded elements one each adjacent an end of the stack of carbon disks, one of said threaded elements for engagement with said electromagnetic means.

5. In a trailer brake system having electric brakes and actuated by a brake system of a tow vehicle, the improvement comprising, a carbon pile voltage regulator with disks of conductive material and including fluid pressure responsive means acting in an axial direction on said disks, electromagnetic means for axially preloading said disks and including a gain control to enable varying end loading of said disks, pressure transmitting means in fluid communication with said pressure responsive means and with the brake system of the tow vehicle, a circuit including a source and switch means responsive to fluid pressure in the hydraulic braking system of the tow vehicle and with input and output terminals of said voltage regulator and the electric brakes whereby current flow to the electric brakes is directly proportional to the fluid pressure in the tow vehicle braking system.

6. The improvement claimed in claim 5 wherein said pressure transmitting means is a diaphram with a membrane.

7. A brake control system for actuating vehicle brakes and comprising, first and second hydraulic lines, pressure transmitting means in direct communication with said lines, one of said lines having a branch for serving hydraulic brakes, a carbon pile voltage regulator with disks including pressure responsive means in communication with another of said hydraulic lines, said carbon pile voltage regulator including electromagnetic means operable to impart end loading to said disks, a gain control remote from said regulator in circuit with said electromagnetic means to enable varying end loading of said disks, conductor means in circuit with the regulator and operable to energize components of the vehicle brakes, and said regulator having an output current flow proportional to the pressure in said hydraulic lines.

* * * * *